Nov. 20, 1923.

W. H. FRANKS 1,474,668

INSECTICIDE DISTRIBUTOR

Filed Sept. 15, 1920    2 Sheets-Sheet 1

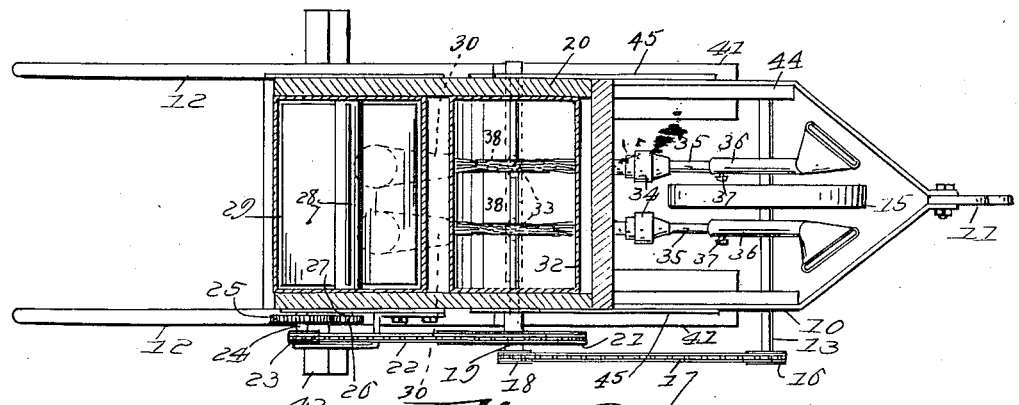
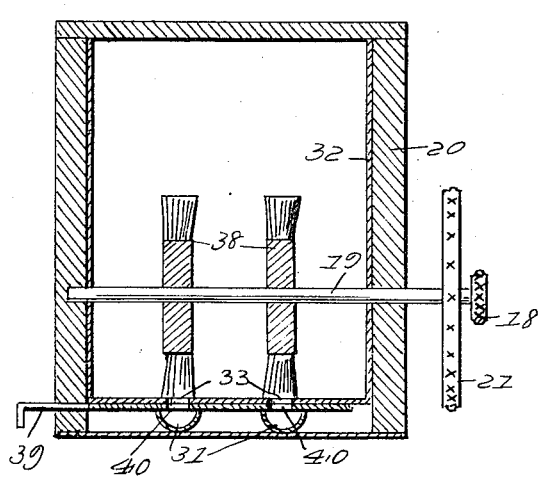
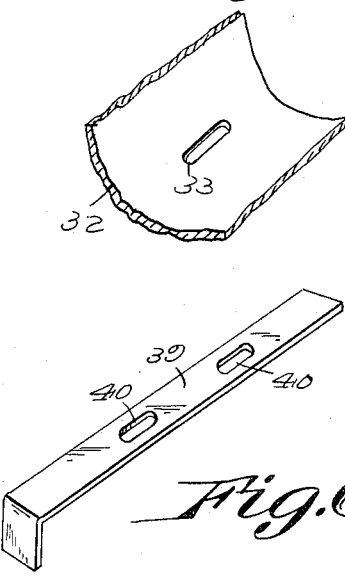

Patented Nov. 20, 1923.

1,474,668

UNITED STATES PATENT OFFICE.

WALTER H. FRANKS, OF WARTHEN, GEORGIA.

INSECTICIDE DISTRIBUTOR.

Application filed September 15, 1920. Serial No. 410,538.

*To all whom it may concern:*

Be it known that I, WALTER H. FRANKS, a citizen of the United States of America, and resident of Warthen, in the county of Washington and State of Georgia, have invented certain new and useful Improvements in Insecticide Distributors, of which the following is a specification.

This invention relates to plant dusting apparatus and has for its object the provision of novel means for distributing calcium arsenate powder over rows of vegetation such as cotton; the said device being operable to distribute the insecticide on two sides of a furrow in order that both rows of vegetation may be treated simultaneously.

An object of this invention is to produce novel means whereby the insecticide in powdered form, which is contained within a hopper or receptacle, may be agitated and delivered in a practical uniform degree during the travel of the machine; the said device having power transmitting means connected to a traction wheel so that as the machine is moved, power is derived for driving the agitator and for furnishing a blast of air to displace and distribute the insecticide.

It has been found in practice by the use of a machine embodying this invention, one operator can dust or distribute the insecticide over the vegetation on ten acres of land in one day in a uniform and satisfactory manner.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 3 illustrates a sectional view taken on line 3—3 of Fig. 1;

Figure 4 illustrates a sectional view on the line 4—4 of Fig. 1 omitting the sprocket chains;

Figure 5 illustrates a perspective view of a fragment of the hopper bottom; and

Figure 6 illustrates a perspective view of the valve or gate for controlling the openings in the hopper bottom.

Figure 1:
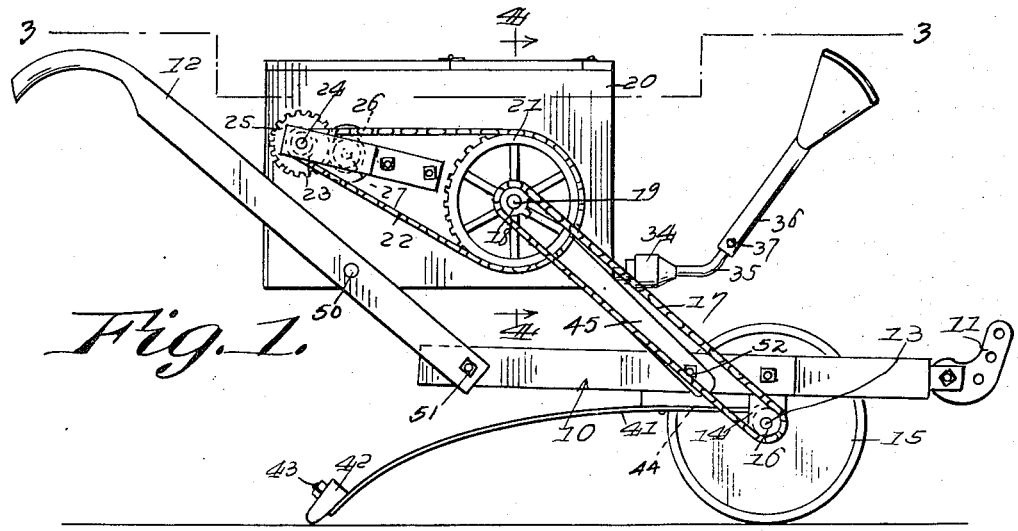
Figure 1 illustrates a view in elevation of a distributing apparatus embodying the invention.
Figure 2:
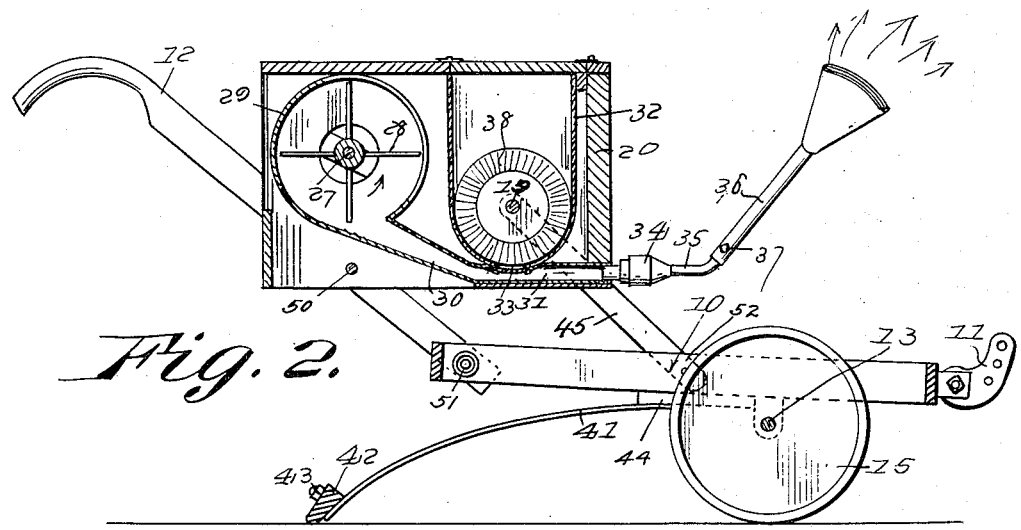
Figure 2 illustrates a sectional view thereof.

In these drawings 10 denotes a frame having a draft rigging 11 at one end and handles 12 at the other end, the said frame being supported on a shaft 13 rotatable in journal bearings 14, the said shaft having a traction wheel 15 secured on it whereby when the traction wheel is rotated, the shaft will be driven. A sprocket wheel 16 is also secured on the shaft 13 and it is engaged by a sprocket chain 17 which runs over a sprocket wheel 18 on a shaft 19 which is journaled through the casing 20. The shaft 19 also has a larger sprocket wheel 21 secured on it engaged by a sprocket chain 22 which operates over a sprocket wheel 23 on a stub shaft 24. A spur gear 25 is also secured on the stub shaft and it meshes with a spur wheel 26 on a fan shaft 27 which is journaled through the casing. Fan blades of any appropriate type 28 are secured on the fan shaft and they rotate in a fan or blower casing 29 having discharge spouts 30 leading downwardly and forwardly into pipes 31 which extend under and communicate with the hopper 32 through apertures 33 in the bottom of the hopper so that material discharged from the hopper into the pipes 31 is blown from the pipes by the blast created through the rotation of the fan.

The pipes 31 have adjustable couplings 34 with tubular extensions 35 thereon, the ends of the said extensions being angularly disposed and being adapted to receive nozzles 36 which are adjustably connected to them by means of fastenings 37 such as set screws. The movable couplings permit an adjustment so that the nozzles may discharge to a higher or lower plane or to a greater or less degree laterally, and therefore, it may act in connection with wide or narrow furrows and yet operate effectively regardless of the height of the vegetation within predetermined bounds.

The shaft 19 which extends through the hopper has brushes 38 mounted on it so that they aline with the apertures in the bottom of the hopper and when they rotate they displace the insecticide and feed it uniformly into the pipes 31. The discharge openings in the bottom of the hopper may be increased or diminished in area by the valve or sliding member 39 provided with elongated openings 40 adapted to aline with the openings in the bottom of the hopper and to register therewith to a greater or less degree according to the adjustment to increase or diminish the discharge of material from the hopper. Spring arms 41 extend rearwardly from strips or longitudinal blocks 44, attached to the under sides of the frame and the spring arms have their lower ends depending into close proximity to the surface of the soil, the said arms being supplied with a shoe or bar 42 secured to them by fastenings 43 such as bolts so that the spring arms yieldably support the rear portion of the frame and permit it to be dragged along over uneven surfaces without unduly affecting the position of the other parts of the mechanism.

The resiliently maintained transverse bar 42, serves as a support for the rear end of the frame 10, particularly, when the machine is not in use, and when in use the bar 42 will bear upon the soil and is dragged along in contact therewith. In operation the handles being grasped the operator can vary the position of the casing and the nozzles. The distributing mechanism is associated with the carrying or supporting frame which has at its forward portion a supporting and drive wheel, the side bars of the supporting frame having attached thereto rearward and downward extending spring arms which are connected by a transverse drag bar 42, secured to their rear ends, and the forward ends of the arms 41 preferably engage blocks or pieces 44, that are fastened to the side bars of the frame 10 to extend downward therefrom and rearward of the bearing blocks for the shaft 13.

The handles 12 are connected to the casing 20 by bolts 50 and to the frame 10 by bolts 51, and the distance between the bolts constitutes a short link. The members 45 adjacent to their upper ends are apertured for the passage of the shaft, and at their lower ends are attached by bolts 52 to the side pieces of the frame and constitute a long link. By reason of the long and short links, the casing will be maintained in raised position above the draft frame.

In operation it will be understood that as the distributor is pulled along, the traction wheel will furnish power for driving the distributing brushes and the blower fan.

The upper end of the hopper is open and a door 44 is hingedly connected to the casing in position to close the upper end of the hopper and prevent the brushes from dissipating the insecticide.

In operation, as the distributor is drawn forward the driver who grasps the handles 12, may exert a lifting and forward pressure thereon, which tends to raise the casing above its normal height which is such that the short link formed by the handles, between their pivotal points of connection with the frame 10 and the casing 20, and the pivotal points of the long links 45, the elevation being restricted by differences in the length of the links or the differences between the pivots of the links.

The short and the long links which connect the casing and its distributing nozzles to a supporting frame of the character shown, and the single wheel with the resiliently attached drag-bar provides a structure in which the casing and distributors attached thereto on opposite sides of the wheel, may be laterally depressed or raised by unequal pressure upon the handles, so that the nozzles as to position may be under control of the operator, to suit the height of plants or the distance between rows of plants.

I claim:

In a distributor for insecticide, a frame having a centrally located supporting and driving wheel, a ground engaging member attached to the frame by resilient members, a container for insecticide, a pair of handles and a pair of links which connect the container with the frame, a pair of insecticide distributors attached to the container and discharging laterally of the line of draft, means within the container and connected with the distributors for projecting insecticide from the container out of the distributors, the organization of the parts being such that the position of the distributors may be varied during the travel of the machine by unequal pressure upon the handles.

WALTER H. FRANKS.